(12) United States Patent
Mobley et al.

(10) Patent No.: US 7,614,074 B2
(45) Date of Patent: Nov. 3, 2009

(54) BURST-MODE DIGITAL TRANSMITTER

(75) Inventors: J. Graham Mobley, Dunwoody, GA (US); Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 990 days.

(21) Appl. No.: 09/840,767

(22) Filed: Apr. 23, 2001

(65) Prior Publication Data

US 2002/0157114 A1    Oct. 24, 2002

(51) Int. Cl.
*H04N 7/173* (2006.01)
*H04B 10/00* (2006.01)
*H04J 14/00* (2006.01)
*H04N 7/16* (2006.01)

(52) U.S. Cl. ............... 725/129; 725/121; 725/127; 398/53; 398/135; 398/182

(58) Field of Classification Search .......... 725/129, 725/121, 127; 359/146, 152, 180; 398/53, 398/132, 135, 138, 182
See application file for complete search history.

(56) References Cited

U.S. PATENT DOCUMENTS

| 3,886,454 | A | * | 5/1975 | Oakley et al. ............. 725/125 |
| 4,644,532 | A | * | 2/1987 | George et al. ............. 370/255 |
| 4,709,418 | A | * | 11/1987 | Fox et al. ................ 398/67 |
| 4,920,533 | A | * | 4/1990 | Dufresne et al. ........... 370/445 |
| 5,321,541 | A | * | 6/1994 | Cohen .................... 398/82 |
| 5,485,197 | A | * | 1/1996 | Hoarty ................... 725/37 |
| 5,488,413 | A |   | 1/1996 | Elder et al. |
| 5,519,530 | A |   | 5/1996 | Utsumi |
| 5,592,540 | A | * | 1/1997 | Beveridge ................ 379/184 |
| 5,724,170 | A |   | 3/1998 | Aizawa |
| 5,765,097 | A | * | 6/1998 | Dail ..................... 725/125 |
| 5,850,218 | A | * | 12/1998 | LaJoie et al. ............. 725/45 |

(Continued)

FOREIGN PATENT DOCUMENTS

JP    20020044030    2/2002

OTHER PUBLICATIONS

U.S. Appl. No. 11/683,640, filed Mar. 8, 2007, entitled "Reverse Path Optical Link Using Frequency Modulation," Inventor: Lamar E. West, Jr.

(Continued)

*Primary Examiner*—Christopher Kelley
*Assistant Examiner*—Reuben M Brown
(74) *Attorney, Agent, or Firm*—Tarolli, Sundheim, Covell & Tummino LLP

(57) ABSTRACT

A transmitter (305) for transmitting reverse optical signals in a broadband communications system (300) that includes a converter (320) for digitizing the analog RF signals and a carrier-detect circuit (330) coupled to the converter (320) for detecting when digital RF signals are present at the output of the converter (320). When the carrier-detect circuit (330) detects digital RF signals, the carrier-detect circuit (330) allows the digital RF signals to be transmitted upstream through the broadband communications system (300). A digital network (310) then combines the received digital RF signals with other digital RF signals from additional transmitters (305). The combined digital signals are then provided to a receiver (315) that includes a converter (335) for returning the digital RF signals to analog RF signals and then providing the analog signals to a headend for further processing.

19 Claims, 5 Drawing Sheets

305

U.S. PATENT DOCUMENTS

| | | | | |
|---|---|---|---|---|
| 5,864,672 | A | * | 1/1999 | Bodeep et al. .............. 725/126 |
| 5,893,024 | A | * | 4/1999 | Sanders et al. .............. 725/125 |
| 6,067,177 | A | | 5/2000 | Kanazawa |
| 6,137,607 | A | | 10/2000 | Feldman et al. |
| 6,137,793 | A | | 10/2000 | Gorman et al. |
| 6,256,329 | B1 | | 7/2001 | Ishizuka et al. |
| 6,282,216 | B1 | | 8/2001 | Ikeuchi et al. |
| 6,418,558 | B1 | * | 7/2002 | Roberts et al. .............. 725/129 |
| 6,462,851 | B1 | * | 10/2002 | West, Jr. .................... 398/141 |
| 6,493,335 | B1 | * | 12/2002 | Darcie et al. ................ 370/344 |
| 6,509,994 | B2 | | 1/2003 | West, Jr. |
| 2002/0075919 | A1 | | 6/2002 | Tochio |

OTHER PUBLICATIONS

U.S. Appl. No. 11/762,397, filed Jun. 13, 2007, entitled "Frequency Modulated Burst Mode Optical System," Inventor: Lamar E. West, Jr.

U.S. Appl. No. 11/762,291, filed Jun. 13, 2007, entitled "Frequency Modulated Burst Mode Transmitter," Inventor: Lamar E. West, Jr., et al.

PCT International Search Report—4 pgs., Jul. 30, 2008, Scientific-Atlanta, Inc.

Juin-Hung Chen et al., "FM Subcarrier Fiber Optical Transmission System Design and Its Application In Next-Generation Wireless Access", Journal of Lightwave Technology, IEEE Service Center, New York, NY, US, vol. 16, No. 7, Jul. 1, 1998, pp. 1137-1148.

Kikushima Koji et al., "Simultaneous Optical Transmission of Optical Transmission of AM-VSB/64-QAM/FM/TC8PSK/QPSK Multichannel Television Signals by Super-wideband FM and BS/CS-RF Conversion Techniques", IEICE Trans Communications, vol. E89-B, No. 11, pp. 3008-3020.

Tomoaki Ohira, Kouichi Masuda, Masaru Fuse, "Study of Super-Wideband FM Technique Using Optical Homodyne-Detection Scheme", ECOC 2005 Proceedings, vol. 4, 2005, pp. 921-922.

Shibutani Makoto et al., "Multichannel VSB-AM Transmission System Using Super-Wideband Frequency Modulator and Demodulator ICs", Conf. Opt Fiber Commun Tech Dig. Ser; Conference on Optical Fiber Communication, Technical Digest Series 1997 IEEE, Piscataway, NJ, USA, 1997, 1 page.

* cited by examiner

US 7,614,074 B2

BURST-MODE DIGITAL TRANSMITTER

FIELD OF THE INVENTION

This invention relates generally to broadband communications systems, such as cable television systems, and more specifically to digital transmitters used within the reverse path of the broadband communications system.

BACKGROUND OF THE INVENTION

A broadband communications system 100, such as a two-way cable television system, is depicted in FIG. 1. The communications system 100 includes headend equipment 105 for generating forward signals that are transmitted in the forward, or downstream, direction along a communication medium, such as a fiber optic cable 110. Coupled to the headend 105 are several hubs 115 that serve sites that may be miles away from the headend 105. Included within the hubs 115 is fiber equipment for further transmission of the optical signals to optical nodes 120 that then convert the optical signals to radio frequency (RF) signals. The RF signals are further transmitted along another communication medium, such as coaxial cable 125, and are amplified, as necessary, by one or more distribution amplifiers 130 positioned along the communication medium. Taps 135 included in the cable television system split off portions of the forward signals for provision to subscriber equipment 140, such as set top terminals, computers, and televisions.

In a two-way system, the subscriber equipment 140 can also generate reverse electrical signals that are transmitted upstream, amplified by any distribution amplifiers 130, converted to optical signals by the optical node 120, and provided to the headend equipment 105. More recently, however, new cable applications, such as interactive multimedia, Internet access, and telephony, are increasing the demand for additional reverse path capability. Cable operators are redesigning the networks 100 to increase the total reverse bandwidth and further refine the network to become two-way active. Some of the difficulties in the growth of the reverse path are that the conventional methods used to transmit reverse signals from a hub 115 to a headend 105 continue to become more complex and expensive as the numbers of reverse paths grow, i.e., more requirements for optical transmitters, optical receivers, and the connecting fiber links. Networks 100 are also beginning to increase the physical territory to include areas that may not have been previously serviced with cable television and considered to be "green space."

To address the increased demands on the reverse path, the analog signals within the reverse frequency range, such as from 5 MHz to 42 MHz, can be converted to digital signals. A simplified digital reverse system that can be used in a typical cable television system is depicted in FIG. 2. Digitizing the reverse bandwidth as shown in FIG. 2 allows the operator to increase the reverse path capacity that is demanded by the growing interactive applications. Briefly, a plurality of digital transmitters 205 each including an analog-to-digital (A/D) converter 208 receives analog electrical signals from a number of connected subscribers and converts the analog signals to digital optical signals. Linked to each transmitter 205 is a digital receiver 210 that includes a digital-to-analog (D/A) converter 215 located further upstream in the network 200. The D/A converter 215 converts the received digitized optical signals back to analog electrical signals for delivery to the headend and further processing. The A/D and D/A converters typically operate around 100 Mega samples per second (Ms/s) with each sample comprising around 10 bits to 12 bits. Consequently, the resulting bit rate of the transmitters 205 and the receivers 210 are around 1 Giga bit per second (Gb/s). Also, the 1 Gb/s data stream is produced regardless of whether there is an RF signal present at the transmitter input or not. Additionally, each reverse link included in the network requires its own digital transmitter 205 and digital receiver 210. As subscribers upgrade their packages to include more advanced services, there may be more links required throughout the network 200 to handle the increased reverse traffic.

It will be appreciated that the digital transmitters 205 and the digital receivers 210 can be utilized in a number of broadband communications products and applications, such as digital reverse transmission from an optical node 120 to the headend 105 or from a hub 115 to the headend 105.

The significant number of transmitters, receivers, and connecting fiber presents an inefficient network design. Another major concern is the impact on the reverse path when operators begin pulling fiber closer to the subscriber. More specifically, the reverse, or upstream, path cannot optically combine the reverse signals coming from the digital transmitters 205. In other words, the links need to remain separate and cannot be combined. In contrast, in the forward, or downstream, path an optical splitter can be used to split the optical signal into a plurality of optical paths where each are then provided to a pocket of homes or, in the case of longer fiber runs, directly to a very limited number of homes. Since the signals cannot be combined in the reverse path, an increased number of reverse digital transmitters, digital receivers, and connecting fiber are required throughout the communications system in order to adequately transmit and receive the reverse RF signals from each subscriber. Thus, what is needed is a method and apparatus for combining the reverse RF signals in the optical domain in order to decrease the amount of required equipment and efficiently receive reverse RF signals at the headend.

DETAILED DESCRIPTION OF A PREFERRED EMBODIMENT

Figure 3:
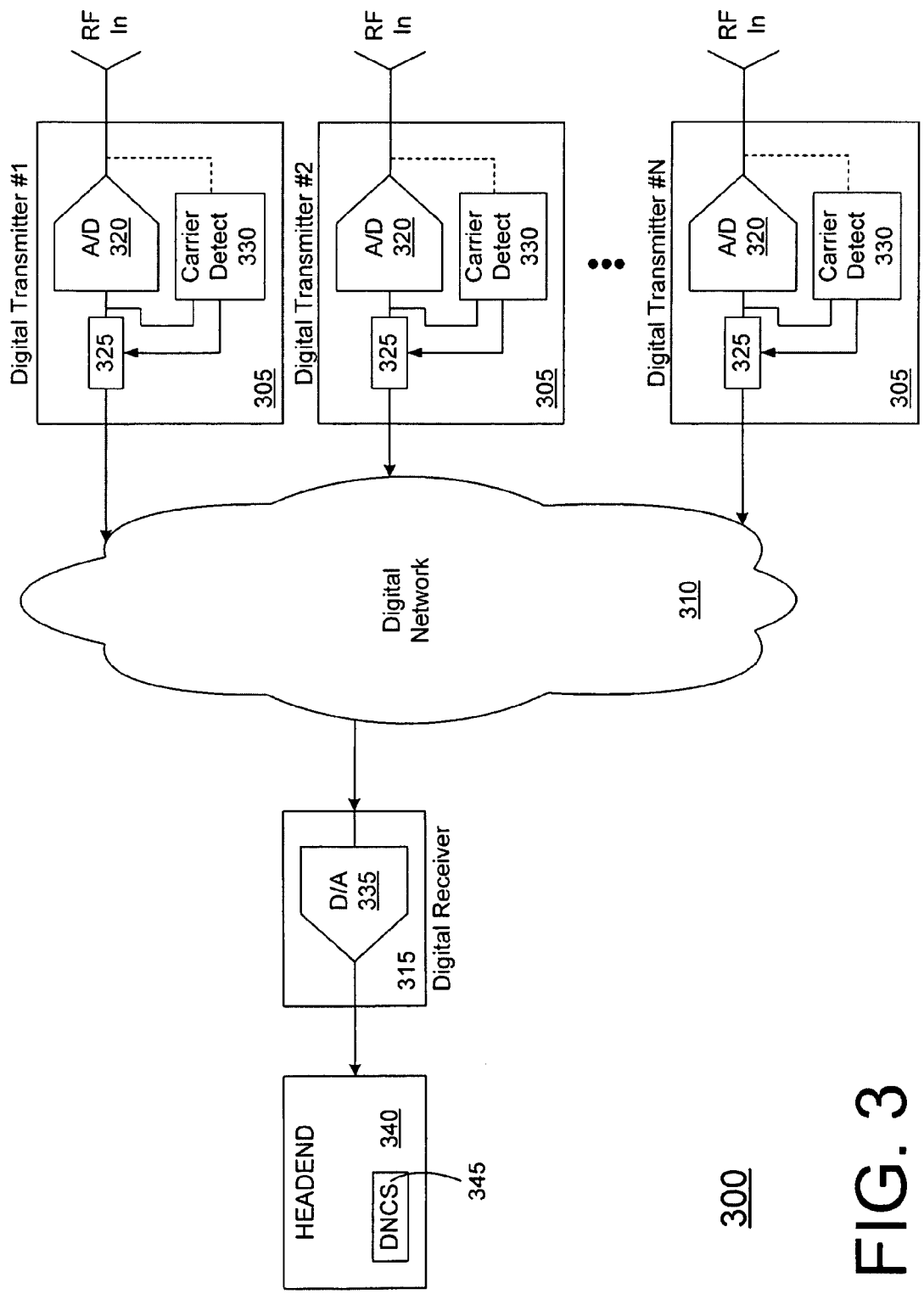
FIG. 3 is a block diagram of a reverse path within a broadband communications system in accordance with the present invention.

The present invention is directed to a "burst-mode" digital transmitter that includes a carrier-detect circuit and is illustrated in FIG. 3. FIG. 3 represents a portion of a reverse communications network 300 that combines the reverse RF signals that are transmitted from a plurality of digital transmitters 305. Briefly, the reverse communications network 300 includes several digital transmitters 305, where the actual number of transmitters 305 depends upon the network design. For example, if the operator pulls fiber directly to the subscriber, an increased number of digital transmitters 305 may be required. If the forward signals are converted to analog signals via an optical node and the signals are then transmitted over coaxial cable supplying an increased number of subscribers, in other words, the signals are transmitted over a hybrid fiber coaxial (HFC) cable, fewer digital transmitters 305 may be required.

The output of each digital transmitter 305 is transmitted upstream through a digital network 310. The digital network 310 may contain devices such as routers and switches that process and combine the digital signals. Internet protocol (IP) addresses allow the routers and switches to route the signals emanating from devices through interconnected fibers within the digital network 310. The digital signals are then received at a digital receiver 315 that further processes the signals and provides them to the headend within the communications network 300.

The reverse communications network 300 can also be a hybrid network that includes both analog signals and digital signals. In a conventional "digital" network, the digital signals carry information relating to telephony, high-speed data, and local area network (LAN) emulation, for example. In a conventional "analog" network, the analog signals, though they are typically digitized, carry information relating to broadcast video and video-on-demand (VOD), for example. The reverse communications network 300 shown in FIG. 3 can be a combination of both of these networks, thereby allowing both digital and analog signals to be combined and transmitted through the same digital network 310 and is discussed in further detail below.

Figure 4:
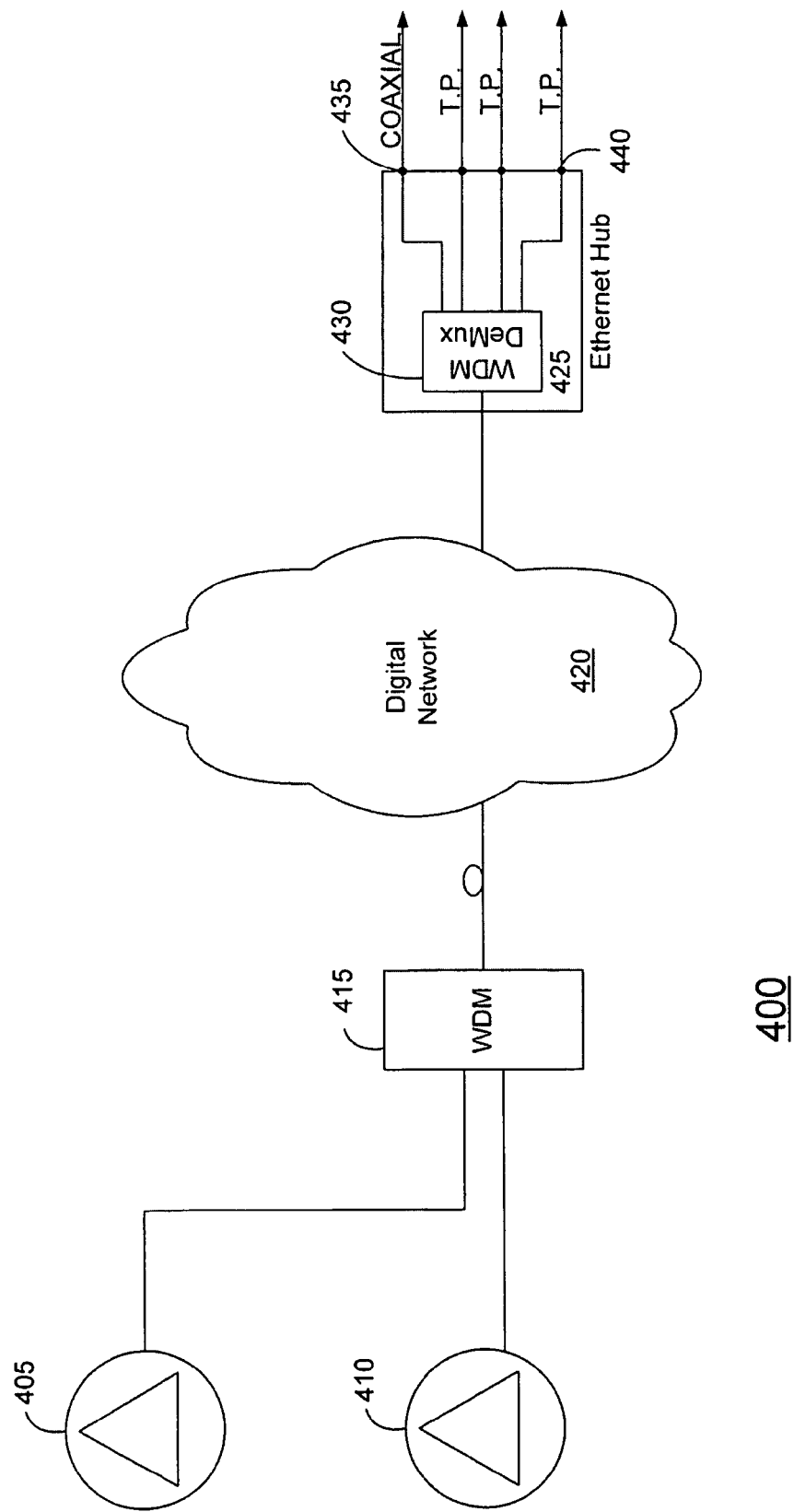
FIG. 4 is a block diagram of a forward digital and analog hybrid network.

FIG. 4 is an example of a forward digital and analog hybrid network 400. One portion of a headend 405 provides the analog RF signals and another portion of the headend 410 provides the digital signals. It will be appreciated that the headends 405, 410 can be physically placed together or separately. Both the analog and digital signals are combined through a wave division multiplexed (WDM) multiplexer 415. The combined forward signals are then transmitted downstream via fiber through a digital network 420, which may include routers and switches, or other such devices that possess the means to route and process the individual wavelengths carrying the analog signals using conventional analog techniques. The forward signals are then demultiplexed, for example, at an Ethernet hub 425 that includes a WDM demultiplexer 430 and an optical-to-electrical converter (not shown). The demultiplexer 430 provides the original analog RF signals through a coaxial cable output 435. The analog RF signals are then amplified and split, if necessary, in the conventional manner and provided to a subscriber. The digital signals are provided to the subscriber via another communication medium, such as a CAT 5 rated twisted pair (T.P.) cable, which is connected to at least one output 440 of the demultiplexer 430. The digital signals generally enter the home through a typical telephone line to a modem, computer, or other digital communications device; whereas, the analog signals generally enter the home through coaxial cable to a modem, set-top, or television.

Again the problem with a digital/analog hybrid network is not necessarily the forward application, but the transmission of the reverse analog RF signals in the upstream path since the reverse optical signals historically cannot be combined, thereby requiring separate links connecting digital transmitters and receivers. Referring again to FIG. 3 and according to the present invention, a method of combining the reverse optical signals regardless if the communications network is an analog network, a digital network, or a hybrid network is shown. Once the reverse analog RF signals are received at a particular transmitter 305, an A/D converter 320 within the transmitter 305 digitizes the signals. The signals are then provided to a delay/switch circuit 325. Coupled between the delay/switch circuit 325 and the output of the A/D converter 320 is a carrier-detect circuit 330. The carrier-detect circuit 330, which may be implemented using analog hardware or digital logic, continuously monitors the output of the A/D converter 320 until a digital RF signal is detected. In another embodiment of the present invention, the carrier-detect circuit 330 can be coupled to the input of the A/D converter 320 to detect any incoming analog signals.

Figure 5:
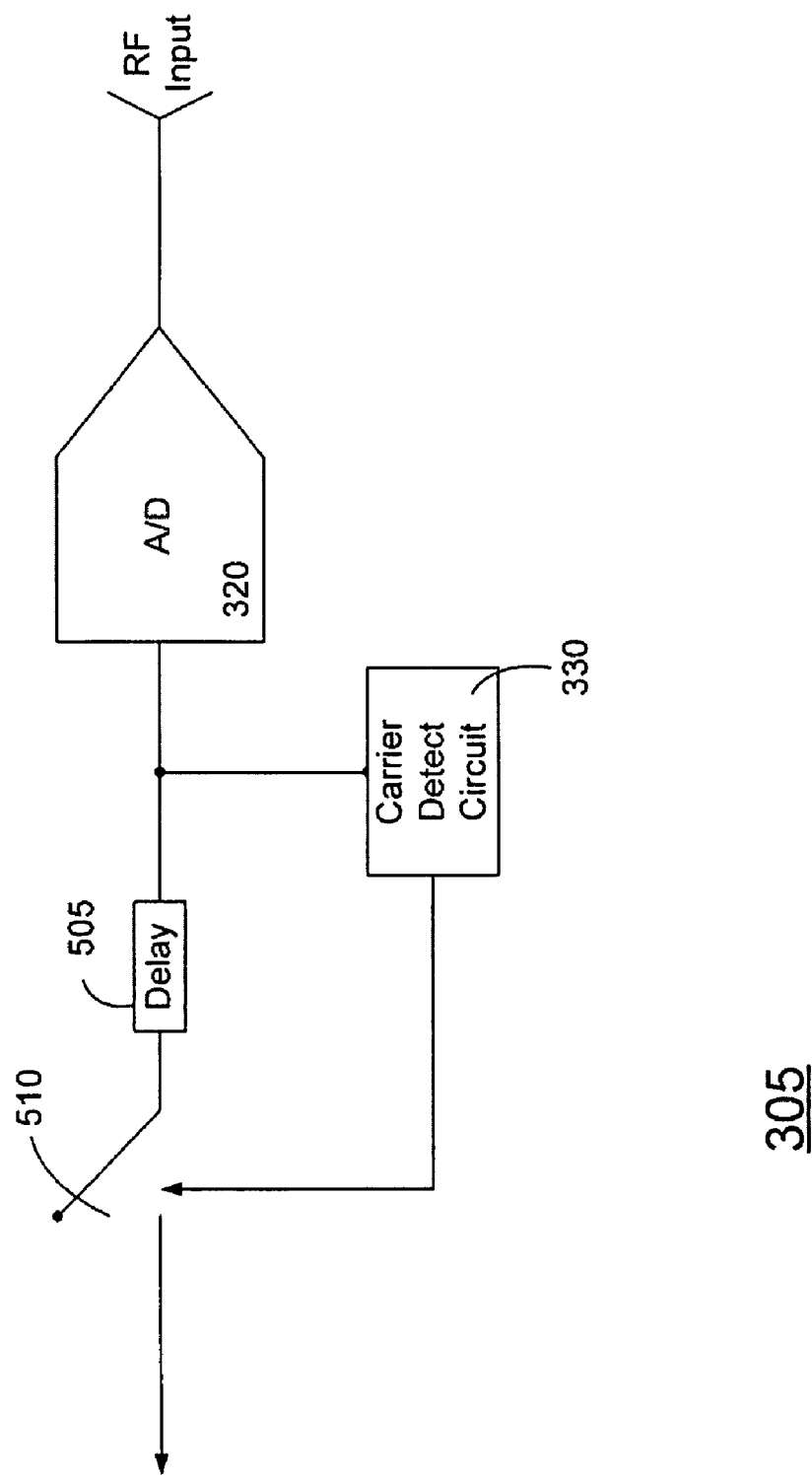
FIG. 5 is a block diagram of a digital transmitter for use in the communications system of FIG. 3 in accordance with the present invention.

FIG. 5 shows the digital transmitter 305 in further detail. The carrier-detect circuit 330 monitors the output of the A/D converter 320 to detect when digital signals are being transmitted. Concurrently, the digital signals are also provided to a delay circuit 505 that delays the signals sufficiently to allow the carrier-detect circuit 330 to determine that a signal is currently being transmitted. The delay circuit 505 prevents any signals from being transmitted and lost prior to the determination by the carrier-detect circuit 330. When there are digital signals being transmitted and the carrier-detect circuit 330 has made the determination, the carrier-detect circuit 330 then controls a switch 510 to provide a continuous path that then allows the reverse digital signals access to the digital network 310 (FIG. 3) where they are combined with other digital signals via routers and switches, for example, for further transmission upstream.

There is, therefore, in accordance with the present invention a digital signal only being transmitted to the output of each transmitter 305 when there is an RF signal present at the input of each transmitter 305. In contrast, the conventional digital transmitter 205 (FIG. 2) sends a continuous digital stream regardless of the presence of an RF signal at its input. It will be appreciated that the subscriber equipment does not continuously transmit reverse RF signals. As a result of this "burstmode" transmission of reverse digital signals, the present invention, advantageously, allows the reverse communications network 300 to utilize a minimum number of digital receivers 315 and as few as one digital receivers 315 depending upon the network design, when previously a digital receiver 210 (FIG. 2) was required for each digital transmitter 205. The instantaneous digital data stream at the output of digital transmitter 305 is still about 1 Gb/s; however, the average data rate may be much lower due to the "burst-mode" scenario of only presenting a digital stream when an RF signal is present at the input of the transmitter 305.

Figure 1:
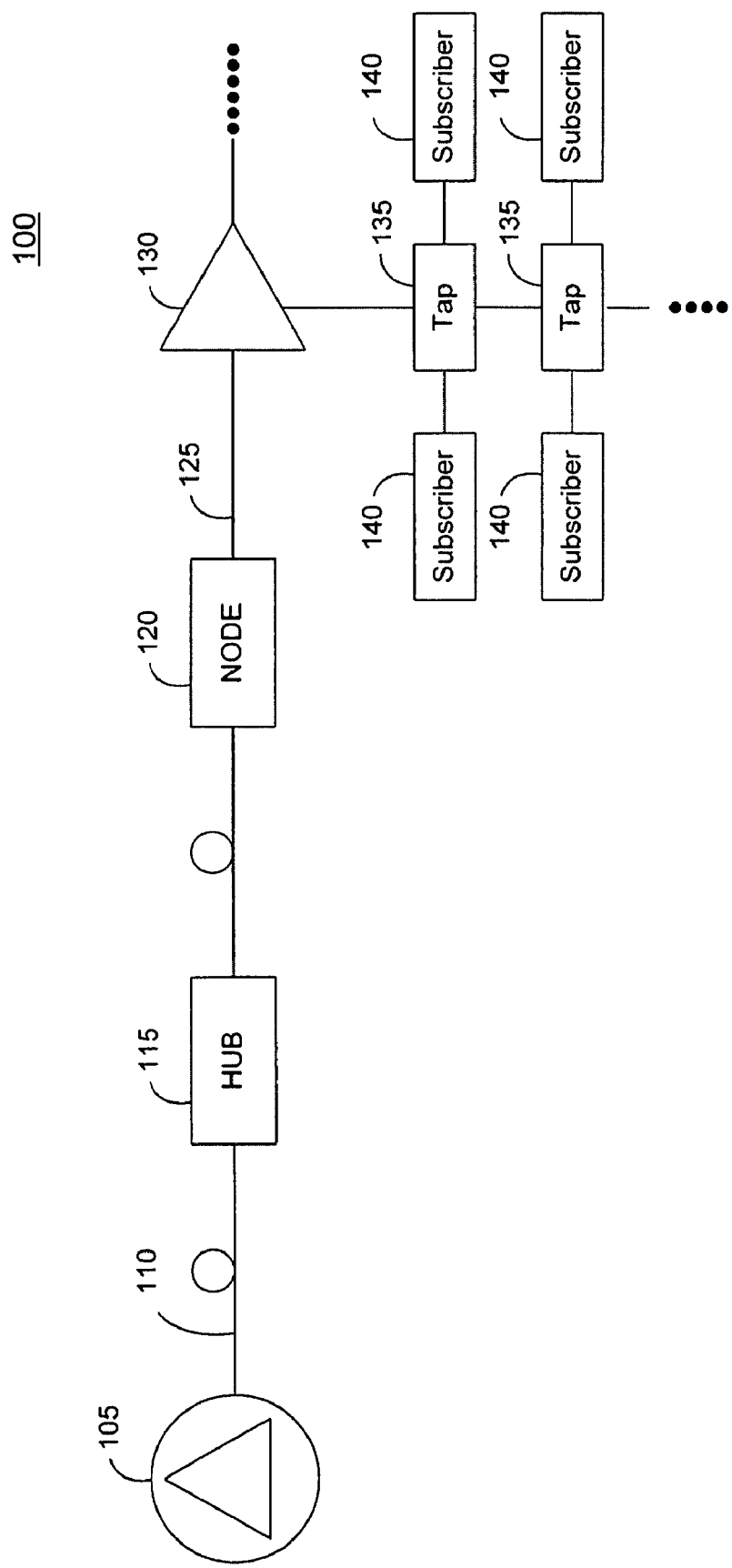
FIG. 1 is a block diagram of a conventional broadband communications system, such as a cable television system.
Figure 2:
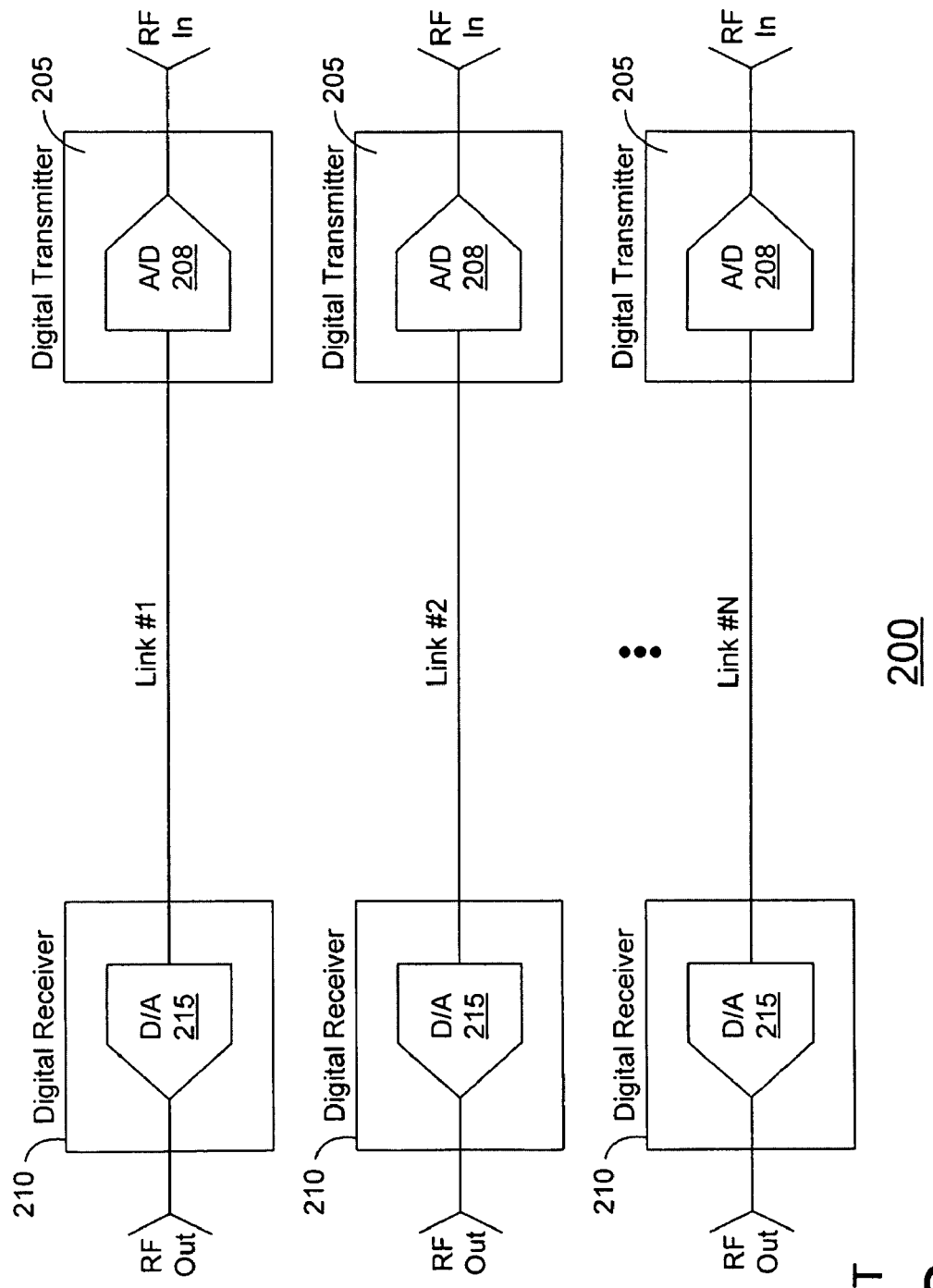
FIG. 2 is a block diagram of a simplified digital reverse system that is used in cable television systems of FIG. 1.

Additionally, the individual links are not required for each transmitter as shown in FIG. 2. In contrast, more sophisticated networking strategies are possible within the digital network 310, such as switched digital networks or Ethernet protocols. The digitized reverse path RF signals may also be "piggy-backed" onto a conventional digital architecture.

Again referring to FIG. 3, the reverse digital signals are provided to the digital receiver 315 that includes a D/A converter 335. The D/A converter 335 converts the combined digital signals back to analog signals for processing at headend 340. Again, each reverse signal originating from a specific digital transmitter 305 has associated header information that is determined and controlled by that specific digital transmitter 305. More specifically, after the digital transmitter 305 digitizes the reverse analog RF signals, header information is assigned. One method is to incorporate analog hardware coupled after the delay circuit 505 that blocks the reverse signals and encapsulates these blocks into Ethernet packets. Each packet is given a header that includes an identifier that indicates that the signal is digitized reverse path data, destination information that indicates that the digital network 310 (FIG. 3) routes this particular packet to the digital receiver 315, and a time stamp so that the data in the packets are reassembled into a continuous data stream in the correct order. Other methods may be utilized, such as media access control (MAC) protocols.

A digital network control system (DNCS) 345 located within the headend 340 controls the signals transmitting within the reverse path so that during processing within the headend, the received information is applied to the correct subscriber. In this manner, the DNCS 345 effectively avoids collision of signals that may be emanating from subscribers at the same time.

If the reverse communications network 300 is a hybrid network and incorporates the conventional reverse "digital" signals, such as Ethernet and high-speed data, a descriminator circuit routes the reverse "digital" signals to a different path before the digital receiver 315. The descriminator circuit uses the header information to determine whether the received signals are the digitized "analog" signals or the "digital" signals as mentioned hereinabove. If the signals are the "digital" signals, the descriminator circuit routes the signals to a digital headend for processing. If, however, the signals are the conventional "analog" signals, the signals are provided to the digital receiver 315 for conversion back to analog signals. The descriminator circuit is typically included within the digital network 310 as routers and switches that simply receive the identifiers of the header information associated with the incoming packetized signals, and then route the signals to the correct upstream path, i.e., the analog path or the digital path.

Advantageously, the reverse communications system 300 described in accordance with the present invention is able to process reverse optical signals in an efficient manner by combining the optical signals at the outputs of the digital transmitters 305. In this manner, less equipment, such as digital receivers and fiber, is required thereby lowering the operational costs of the networks. Additionally, as networks begin to offer more advanced services, and, more importantly, when the digital and the analog realms begin to merge, the present invention is able to process both signals along the same digital network 310. This is extremely important in that two separate networks will not have to be physically combined to handle the different signals; but instead, a digital network 310 already in place can combine the different signals by simply adding the digital transmitter 305 in accordance with the present invention. In summary, as the digital and analog service providers begin to merge, they will be analyzing very closely the feasibility of providing both services by looking at the infrastructure that is currently in place to minimize any capital costs that can be avoided relating to the future services that may be provided.

What is claimed is:

1. A cable television system for transmitting forward and reverse signals, the cable television system comprising a communications system comprising:
   a plurality of optical nodes including a reverse optical transmitter, each optical node for receiving reverse analog electrical signals modulated onto radio frequency (RF) carriers from a plurality of subscriber equipment and for providing reverse digital optical signals, each reverse optical transmitter comprising:
      a converter for converting the reverse analog electrical signals into digitized electrical reverse signals;
      a RF carrier-detect circuit coupled to the converter for monitoring at least one of an input of the converter and an output of the converter, the RF carrier detect circuit providing a control signal in response to detecting the presence of a RF carrier signal in the reverse analog electrical signals;
      a delay circuit coupled to the converter for delaying the digitized electrical reverse signals provided by the converter;
      a switch coupled to receive the delayed digitized electrical reverse signals provided by the delay circuit, the switch being controlled by the RF carrier-detect circuit for selectively connecting the reverse optical transmitter with a digital network such that the reverse optical transmitter transmits the reverse digital optical signals upstream through the digital network only if the carrier-detect circuit detects the presence of the RF carrier signal in the reverse analog electrical signals; and
   a reverse optical receiver, coupled to the plurality of optical nodes via the digital network, for receiving and passively combining the reverse digital optical signals from each of the plurality of optical nodes.

2. The system of claim 1, further comprising:
   the reverse optical receiver coupled to the digital network for receiving the combined reverse digital optical signals, and for converting the combined reverse digital optical signals to analog electrical signals; and
   a headend coupled to the reverse receiver for receiving and processing the analog signals,
   whereby, due to a burst-mode transmission from each of the plurality of optical nodes, the digital network combines the reverse digital optical signals from the plurality of optical nodes using header identifier information that is controlled by the respective reverse optical transmitter.

3. The system of claim 2, wherein the cable television system that includes both a digital headend and an analog headend for generating and receiving combined digital optical signals in both the digital and the analog formats.

4. The system of claim 3, wherein the communications system further includes:
   a descriminator circuit coupled between the digital network and the digital headend and the analog head end for analyzing the header identifier information contained in the passively combined reverse digital optical signals,
   wherein dependent upon the header identifier information, the descriminator circuit provides the combined reverse digital optical signals from the digital network to one of the digital headend and the analog headend.

5. A communication system for transmitting and receiving optical signals over a communications medium, the communications system comprising:
   subscriber equipment for transmitting reverse electrical signals;
   a plurality of optical transmitters coupled to at least one of the subscriber equipment for converting the reverse electrical signals into reverse digital optical signals having a predetermined wavelength, wherein each of the plurality of optical transmitters comprising:
      a converter for converting the reverse analog electrical signal to a reverse digital optical signal;
      a carrier-detect circuit coupled to monitor reverse analog electrical signals at the input of the converter;
      a delay circuit for preventing loss of information in the reverse signal due to the carrier-detect circuit; and
      a switch, coupled to the delay circuit, the carrier-detect circuit controlling the switch, in response to the carrier-detect circuit detecting the presence of a reverse carrier signal in the reverse analog electrical signals, to allow the respective optical transmitter to transmit the reverse digital optical signal upstream through a digital network only when the carrier detect circuit detects the presence of the reverse carrier signal;

the digital network, coupled to each of the plurality of transmitters, for passively combining the reverse digital optical signals;

a receiver coupled to the digital network for converting the reverse digital optical signals back to the original reverse signals; and a headend coupled to the receiver for processing the reverse signals.

6. The communications system of claim 5, wherein each of the plurality of transmitters formats the reverse digital optical signals as packets with associated identifier header information for identification within the headend.

7. The communications system of claim 6, wherein the communications system is a cable television system that includes both a digital headend and an analog headend.

8. The communication system of claim 7, wherein the communications system further comprises:

a descriminator circuit coupled to the digital network for analyzing the associated identifier header information, wherein dependent upon the identifier header information, the descriminator circuit provides the packets to one of the digital headend and the analog headend.

9. The communications system of claim 7, wherein a control system is used in connection with both the digital and the analog headends for preventing collision of the reverse signals.

10. The communications system of claim 5, wherein the communications medium is a hybrid fiber coaxial cable.

11. The communication system of claim 5, wherein at least one of the plurality of optical transmitters further comprises an analog-to-digital converter for converting a reverse analog electrical signal to a digitized reverse electrical signal, wherein the optical transmitter converts the digitized reverse electrical signal to provide the reverse digital optical signal.

12. The communications system of claim 11, wherein the carrier-detect circuit is coupled to the output of the analog-to-digital converter.

13. A method for conducting reverse communications in a subscriber television system, comprising:

receiving at an optical transmitter reverse analog electrical signals from a plurality of subscriber equipment;

converting the reverse analog electrical signals to reverse digital electrical signals;

delaying the reverse digital electrical signal signals;

transmitting the reverse digital electrical signals as digital reverse optical signals upstream to a digital network only when the presence of a reverse carrier signal is detected by a carrier-detect circuit;

passively combining a plurality of the reverse digital electrical signals as digital reverse optical signals received from a plurality of optical transmitters at a digital network; and converting at a receiver the plurality of reverse digital optical signals back to a plurality of the reverse analog electrical signals.

14. The method of claim 13, further comprising converting an analog reverse electrical signal to a digitized reverse electrical signals by using an analog-to-digital converter, the presence of a reverse carrier signal being detected by the carrier-detect circuit continuously monitoring one of an input of and an output of the analog-to-digital converter.

15. The method of claim 13, wherein the reverse digital optical signal is formatted in packets and combining is performed using header identifier information contained in the packets.

16. The method of claim 13, wherein the plurality of reverse digital optical signals are transmitted at a common wavelength and combined at the common wavelength.

17. The method of claim 13, further comprising:

providing the reverse digital optical signals to one of an analog headend and a digital headend.

18. The method of claim 17, wherein the reverse digital optical signals are formatted in packets and provided to one of the analog headend and the digital headend based on analysis of packet header information by a descriminator circuit.

19. The method of claim 13, further comprising decombining the combined plurality of reverse digital optical signals without the use of wave division multiplexers.

* * * * *

UNITED STATES PATENT AND TRADEMARK OFFICE
CERTIFICATE OF CORRECTION

PATENT NO. : 7,614,074 B2
APPLICATION NO. : 09/840767
DATED : November 3, 2009
INVENTOR(S) : Mobley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1215 days.

Signed and Sealed this

Nineteenth Day of October, 2010

David J. Kappos
*Director of the United States Patent and Trademark Office*